United States Patent [19]

Williams

[11] 4,331,345
[45] May 25, 1982

[54] IMPLEMENT WEIGHT TRANSFER

[76] Inventor: Malcolm L. Williams, Lot 15, Swanport Rd., Murray Bridge, South Australia 5253, Australia

[21] Appl. No.: 91,267

[22] Filed: Nov. 5, 1979

[30] Foreign Application Priority Data

Nov. 3, 1978 [AU] Australia .............................. PD6628

[51] Int. Cl.³ .............................................. B60D 1/14
[52] U.S. Cl. .................................. 280/405 B; 172/677; 280/406 R; 280/447; 280/461 A; 280/497
[58] Field of Search .......... 280/405 R, 405 A, 405 B, 280/406 R, 406 A, 415 A, 496, 497, 498, 499, 501, 456 A, 461 A, 482; 172/677, 678, 679; 180/446 A, 447

[56] References Cited

U.S. PATENT DOCUMENTS 1,775,268  9/1930  Baldwin .......................... 280/461 A
3,096,998  7/1963  Stadelman ....................... 280/405 B
3,269,748  8/1966  Mazery ............................ 280/405 B
3,955,831  5/1976  Whitchurch .................... 280/423 R
4,032,169  6/1977  Filan ............................... 280/405 B

FOREIGN PATENT DOCUMENTS 22663 10/1956 Fed. Rep. of Germany ... 280/406 R

Primary Examiner—Joseph F. Peters, Jr.
Assistant Examiner—Donn McGiehan
Attorney, Agent, or Firm—Pearne, Gordon, Sessions, McCoy & Granger

[57] ABSTRACT

An implement hitch arrangement comprising a fore carriage extension on the implement connected to a turntable above the rear axle of the tractor whereby the implement is supported at its front end on the tractor. The implement is drawn by a conventional draw bar, so that the weight of the implement is not taken by the draw bar, but by the fore carriage extension.

1 Claim, 2 Drawing Figures

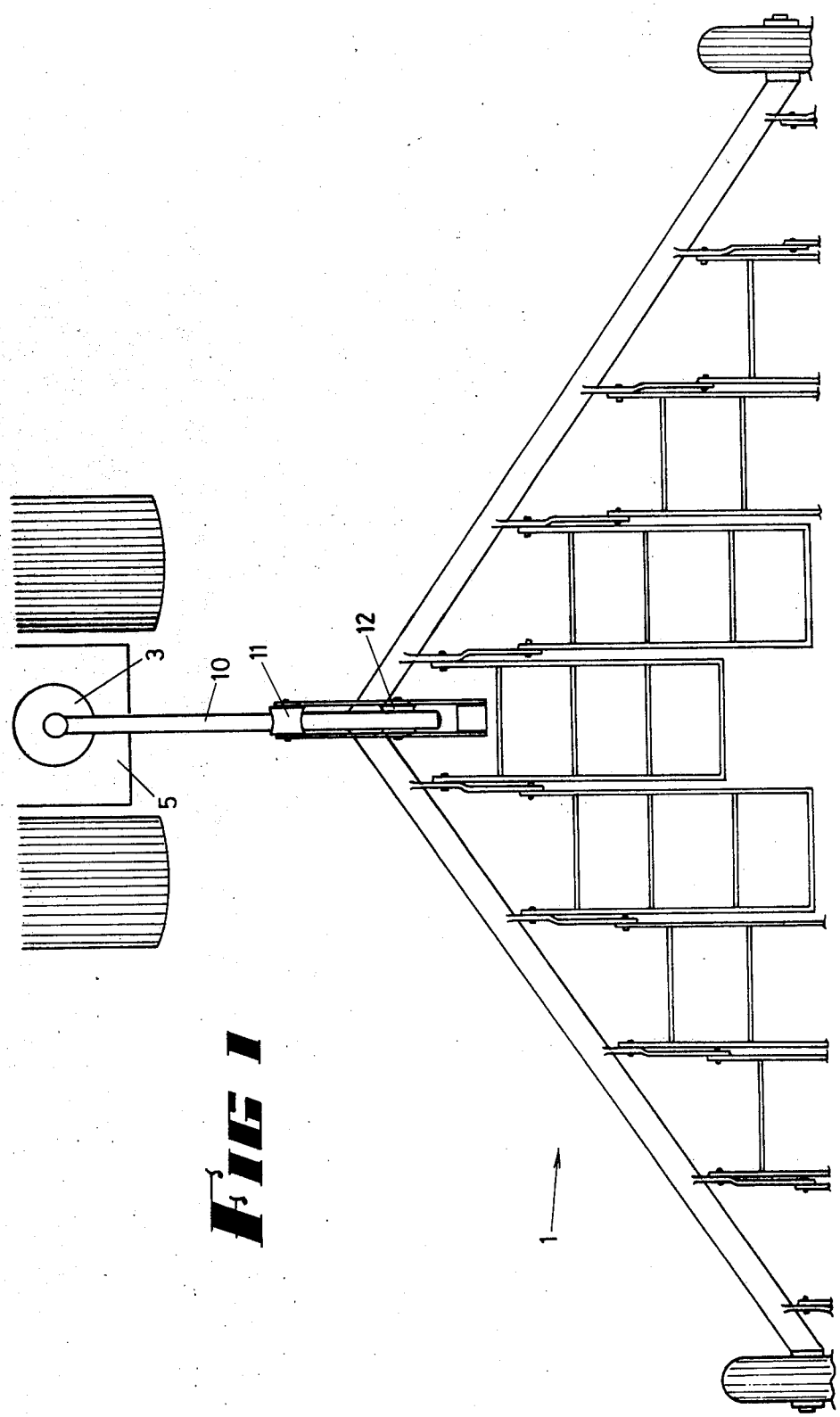

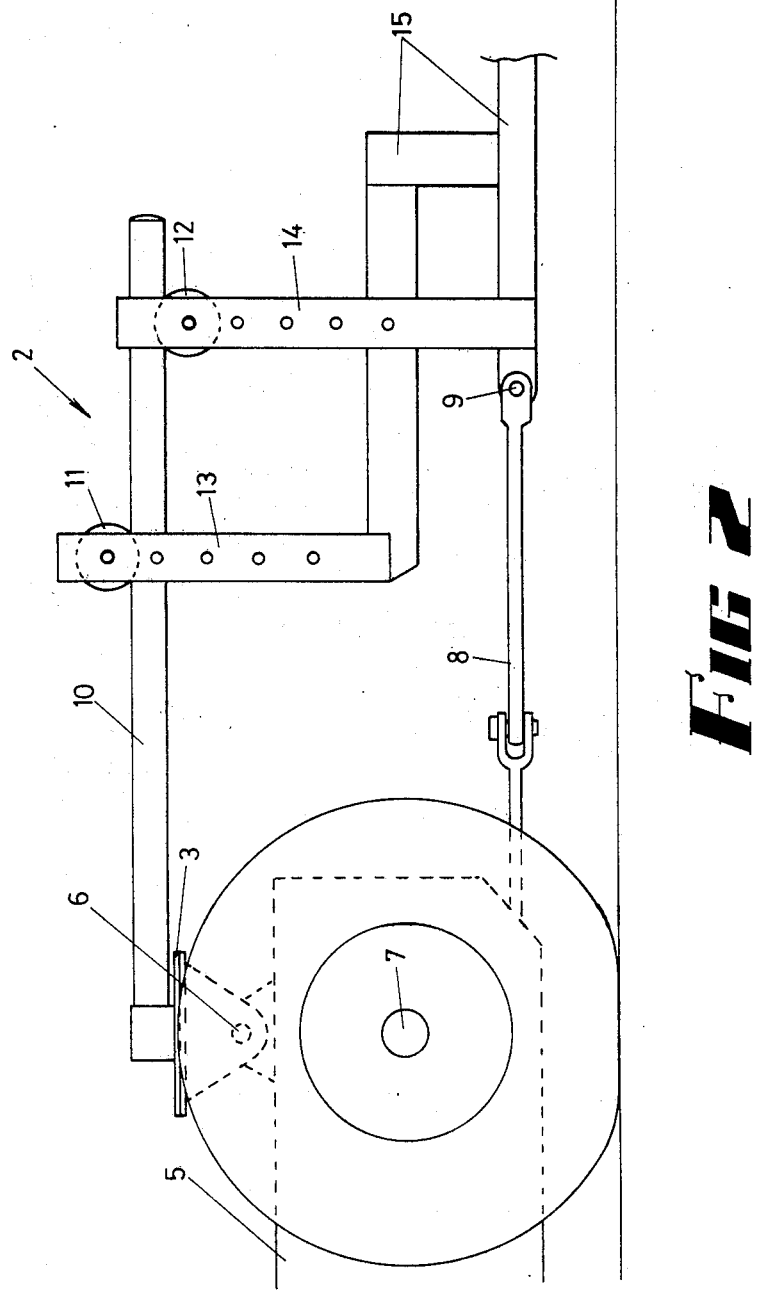

IMPLEMENT WEIGHT TRANSFER

This invention relates to agricultural implements, and more particularly to the attachment of the implement to the towing tractor so that the weight of the implement is transferred to the tractor to increase the traction thereof.

BACKGROUND OF THE INVENTION

In my earlier Australian patent specification No. 421,141 to which reference can be made, there is described an implement having a V-shaped frame, with land wheels being provided at the ends of the arms of the V, with the apex of the V being attached to and supported by the tractor. In this way the transfer of weight from the carrying implement to the tractor is considerable, and is often at least half the weight of the implement, together with the downward forces produced by the cultivating tool.

This invention is directed to an improved hitch arrangement for such an implement, the hitch in the previous Patent being a conventional hitch to the draw bar of the tractor, where although the transfer of weight to the tractor is achieved, this weight is often transferred to the tractor just rear of the rear axle, and often some considerable distance behind the rear axle. This reaction point on the tractor can give rise to a dangerous situation the tractor tending to rear backwardly.

Various attempts have been made in order to transfer some or all of the weight from a trailed vehicle or implement to the towing tractor.

Thus U.S. Pat. Nos. 1,623,179; 1,799,846; and 2,647,761 discloses a hitch for a trailed vehicle or implement where the connection between the trailed vehicle and the tractor vehicle is at or slightly in front of the rear axle of the tractor vehicle, so that this connection comprises both the draw bar and the weight transfer mechanism.

U.S. Pat Nos. 2,639,159 and 2,312,258 show linkages and mechanisms interconnecting the implement and tractor draw bar in order to achieve some degree of weight transfer, but this transfer of weight is only applied on the conventional draw bar behind the rear wheels of the tractor.

U.S. Pat. Nos. 3,955,831; 3,215,404; 2,899,004 and 2,642,293 each show a hitch arrangement whereby there is a degree of weight transfer from the implement to the tractor, by a linkage separate from the conventional draw bar. Thus there is a lower link and an upper mechanism which transfers or supports some of the weight and/or forces of the trailed implement or machine.

BRIEF DESCRIPTION OF THE INVENTION

Thus it is an object of this invention to provide improved hitch arrangement for the attachment of a trailed implement to a towing tractor in which the hitch arrangement is provided at a more advantageous location on the tractor.

Thus there is provided according to the invention a hitch arrangement for a towed implement, in which the front of the implement is supported by the tractor, the arrangement being such that the implement is provided with a fore carriage which is pivotally supported on the tractor and adjacent the rear axle, the draft being applied to the implement for towing through the conventional draw bar attached to the tractor.

BRIEF DESCRIPTION OF THE DRAWINGS

FIG. 1 is a plan view, and
FIG. 2 is a side elevation of the invention.

DESCRIPTION OF THE PREFERRED EMBODIMENT

As shown in the drawings, the implement 1 can be of the type as shown in Australian Pat. No. 421,141 where the implement has rear wheels and is supported at the front on the tractor to achieve weight transfer.

The fore carriage 2 of the implement is extended, the fore carriage ending in a turn table 3 having a vertical axis, this turn table being attached to the rear of the tractor 5 by a generally horizontal pivot 6 parallel to the rear axle 7 of the tractor. Thus the required pivoting is achieved to allow the tractor to turn corners, and also the horizontal pivot allows relative movement between the tractor and implement about a horizontal axis.

It is to be realised that the actual towing force applied to the implement by the tractor is by a separate draw bar 8 which extends parallel to the extended fore carriage 2, but at a considerable distance therebelow, the draw bar being pivoted by pivot pin 9 to the implement 1.

The fore carriage 2 of the implement 1 carries an extension member 10 and is supported by a pair of spaced rollers 11, 12, these rollers being spaced longitudinally along the fore carriage, and also spaced in a vertical arrangement with the forward roller 11 being at a higher position than the rear roller 12.

This vertical relationship between the rollers 11, 12 is of such a dimension that the extension member 10 is supported thereby, this extension member being attached to the upper member of the turn table 3. Thus it will be seen that due to the spaced rollers 11, 12 engaging at opposite sides of the extension member 10, that the weight will be transferred to the turn table, with the rollers on the extension member allowing the change in the vertical plane between the tractor and the drawn implement by rolling along the extension member.

The rollers 11, 12 are mounted on brackets 13, 14 welded or otherwise attached to the frame 15 of the implement, the rollers 11, 12 being adjustable positioned on each bracket 13, 14 not only to accommodate size for the extension member, but also to provide adjustment for fitting the invention to various tractors whose vertical position for mounting the turn table 3 would vary.

In a preferred form of the embodiment the turn table would be mounted on the tractor in such a position that it would be at least over the rear axle, or slightly forward thereof, and be of such a height, that the extension member 10 would, when the tractor is turning a corner, pass over above the rear wheels of the tractor.

In a preferred form of the invention the extension member can be a circular section member, with the respective rollers being of an arcuate shape to engage the extension member.

Also while the extension member 10 is illustrated as being straight, it can be formed with a goose neck shape to provide clearance over the wheels where the turn table is mounted below the level of the tyres. Also it will be realized that the telescoping of the extension member can be by other means, and the member could slide in a sleeve, and if desired rollers or balls can be provided in the sleeve to minimise the frictional forces encountered due to the large force applied on the extension member due to the weight transfer.

Thus it will be seen that according to the invention there is provided an effective means of mounting an implement on a tractor such that there is effective weight transfer, this being as near as possible to the vertical plane including the rear axle, and either being on this plane or slightly forward thereof in order to prevent the rearing of the tractor.

Even if the turn table can not be mounted directly above or forward of the rear axle, by the invention which allows a limited change from the angular relationship between the tractor and implement in the vertical or longitudinal plane the invention would prevent any excessive angular change such as if the tractor were rearing upwardly, and thus the hitch provides an effective safety measure in this regard.

Also with the advent in the design of tractors, such as four wheel drive tractors which are articulated in the centre of the chassis, and with the development on much wider tyres, thus having a wide profile and a correspondingly reduced diameter, the form of the invention can be readily applied to such tractors which allows the extension of the fore carriage of the implement to pass above the rear wheels of the tractor to allow and provide for an adequate turning radius of the tractor and implement.

Although one form of the invention has been described in some detail it is to be realised tht the invention is not to be limited thereto but can include various modifications falling within the spirit and scope of the invention.

I claim:

1. An implement weight transfer hitch for transferring the weight from a trailed implement to a towing tractor having a rear axle adjacent the trailed implement, said hitch having a fore carriage adapted to be pivotally supported on the tractor to support at least a portion of the weight of the implement on the tractor, a draw bar on the implement connectable to the tractor for transmitting towing forces therebetween through a vertical pivot spaced rearwardly of the vertical plane of the rear axle, the fore carriage being vertically spaced above the draw bar and including telescopic means to allow relative pivotal movement of the tractor and implement in a vertical plane and to prevent substantial towing forces from being transmitted therethrough, characterized in that said telescopic means includes an extension member connectable to a turntable mounted on said tractor at or adjacent a plane including the rear axle of said tractor, said extension member being supported by a pair of rollers mounted in brackets attached to said fore carriage, said rollers being longitudinally spaced along said member and in contact with opposite sides thereof, said forward most roller beng positioned on an upper surface of the extension member and the other roller on a lower surface thereof, said brackets including means to adjustably position said rollers in a vertical plane.

* * * * *